May 27, 1958  W. A. STRAUSS, JR  2,836,180
FLUID CONDUIT AND FLOW CONTROL APPARATUS
Filed Aug. 31, 1954  2 Sheets-Sheet 1
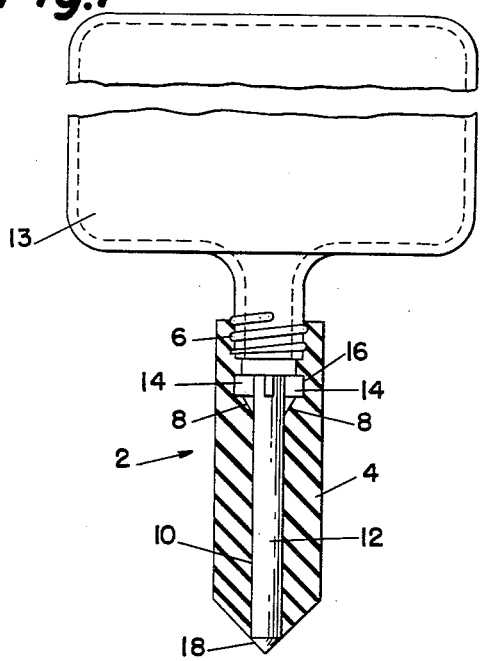
Fig.1
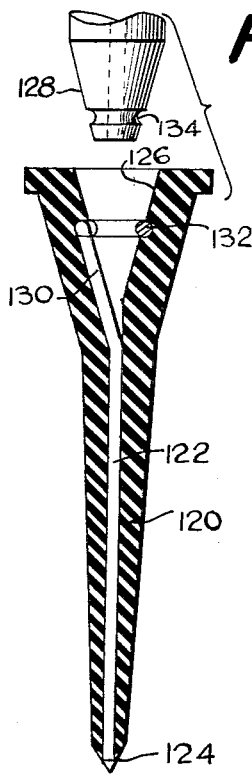
Fig.9
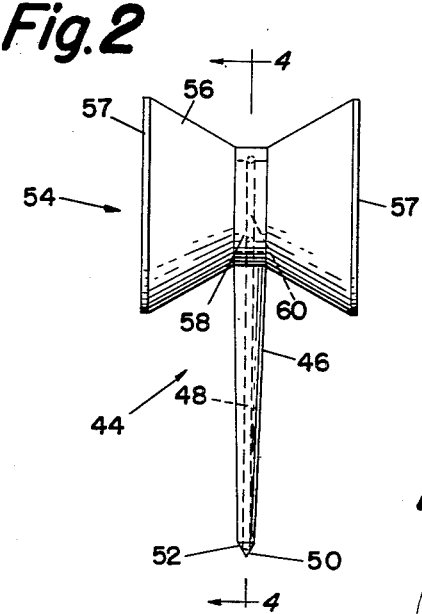
Fig.2
Fig.3
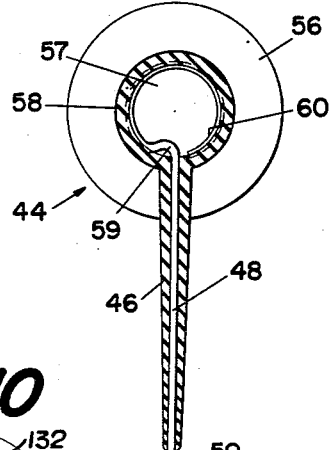
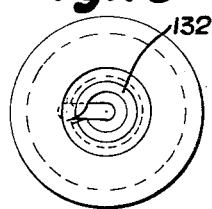
Fig.10
INVENTOR.
WILLIAM A. STRAUSS JR
BY
ATTORNEYS

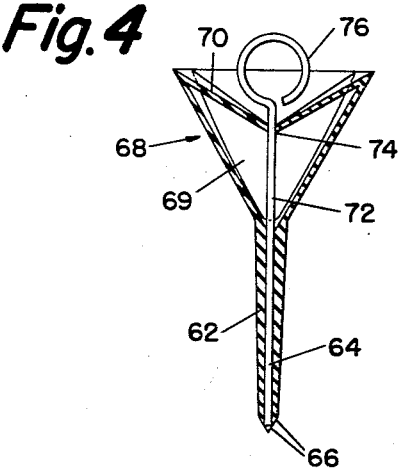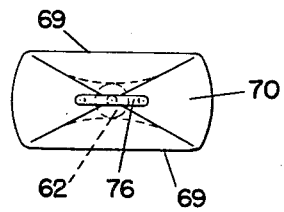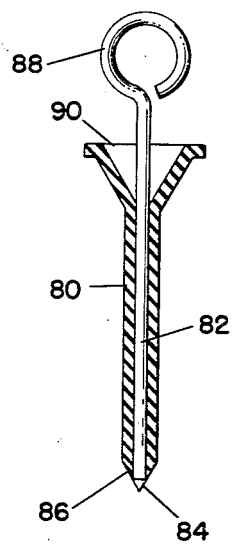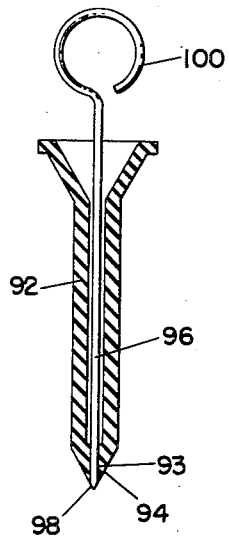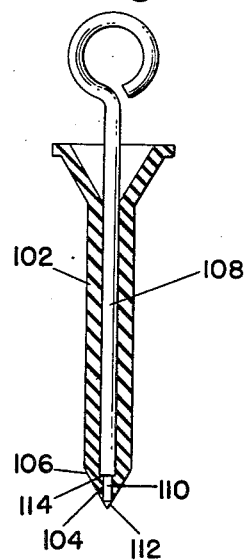

United States Patent Office 2,836,180
Patented May 27, 1958

2,836,180

FLUID CONDUIT AND FLOW CONTROL APPARATUS

William A. Strauss, Jr., Flourtown, Pa., assignor of one-half to Charles C. Chapple, Flourtown, Pa.

Application August 31, 1954, Serial No. 453,211

16 Claims. (Cl. 128—215)

This invention relates to fluid conduit and flow control apparatus, and more particularly to a self-valving conduit having a longitudinally extending central plug member surrounded by a conduit-forming member in combination with which it provides a seal preventing a flow in at least one direction through the conduit.

It is an object of the invention to provide a simple and inexpensive flow control value which will operate on pressure differences. The flow control valve may, for example, be employed as follows:

The valve may be employed as a dispenser valve providing a material conduit and valve which may be associated with a permanently attached or a detachable container such as may be desirably employed in dispensing materials where it is desirable to prevent exposure of the material in the container to light, air, contamination, evaporation, moisture, etc., during dispensing, as well as before and after dispensing. Such a dispenser would be desirably employed, for example, in the dispensing of volatile, sterile and light, air or moisture sensitive materials. This type of dispenser may be employed in applications in which the entire contents of a container is discharged in one operation, in applications in which the contents of a container is discharged only occasionally and/or in minute quantities, and in applications in which the contents of a container are discharged continuously over an extended period of time.

It is an additional object of the invention to provide an improved type of hypodermic needle and/or hypodermic syringe in which the hypodermic needle is in the form of a tube made of a plastic, a rubber or a similar flexible material supported by a longitudinally extending internal member having sufficient stiffness to support the tube and being capable of being sharpened sufficiently to provide the necessary point required to penetrate the body which is to receive the hypodermic injection. After the tube has been inserted into the body, the longitudinally extending member may be removed to provide an open conduit for the passage of the material to be injected. Alternatively, the conduit may be formed of a distensible material such that the injectable may be forced between the longitudinally extending member and the inside wall of the tube which will become distended upon the application of pressure on the injectable.

One highly desirable aspect of the invention lies in the fact that after the tube and the longitudinal supporting member have been inserted into a patient's body, the supporting member may be withdrawn and the flexible tube may then remain inserted into the patient's body without danger of breakage or injury resulting such as may occur when a steel hypodermic needle is used. It will be evident that the use of flexible hypodermic needles will add greatly to a patient's comfort when it is considered that in cases involving frequently repeated injections in which a hypodermic needle is permitted to remain in the patient's body, it is frequently necessary to immobilize the portion of the patient's body penetrated by the hypodermic needle by various means including the application of a plaster cast to the region penetrated by the needle in order to prevent the possibility of injury to the patient occurring as a result of movement by the patient or of accidental bumping of the needle.

It is a further object of the invention to provide in combination a sealed container and dispensing valve in the form of a hypodermic needle for use in connection with pre-prepared fixed dose injectables such as tetanus toxoid, various antidotes, morphine, and the like, for emergency treatment and/or expeditious use.

These and other objects of the invention will become apparent from the following description when read in connection with the following drawings, in which:

Figure 1 is an elevation partly in section showing one embodiment of the invention;

Figure 2 is an elevation of another embodiment of the invention showing the invention employed in unitary combination with a sealed flexible container;

Figure 3 is a section taken on the trace 4—4 of Figure 2;

Figure 4 is an elevation partly in section showing a modified form of the invention shown in Figure 2;

Figure 5 is a top view of Figure 4;

Figure 6 is an elevation partly in section showing a supported flexible hypodermic needle constructed in accordance with the invention;

Figure 7 is an elevation partly in section showing a modification of the apparatus shown in Figure 6;

Figure 8 is an elevation partly in section showing another modification of the apparatus shown in Figure 6;

Figure 9 is an elevation partly in section showing still another form of the apparatus shown in Figure 6;

Figure 10 is a top view of Figure 9.

In Figure 1 there is shown generally at 2 an embodiment of the invention adapted to be attached to a container and to provide a self-sealing dispensing outlet conduit for fluid contents of the container. In this embodiment of the invention there is provided a distensible member 4 in the form of a sleeve having a longitudinally extending bore formed successively by a threaded internal bore 6, an annular recess 16, a tapered internal bore 8 and a smooth wall internal bore 10. The threaded internal bore 8 is adapted to engage the threaded neck of a container 13 which may be a flexible container or may be the end of a conduit conducting a fluid material. The distensible member 4 may be formed of any of a variety of well known distensible plastic materials such as, for example, polyethylene, or polystyrene, or may be formed of latex rubber, synthetic rubber, or combinations of latex and synthetic rubber.

A plug or supporting member in the form of a rod 12 is positioned within the bore 10 and is of such diameter as to be in sealing engagement with the wall of the bore 10 for its entire length. The upper end of the plug 12 is provided with a plurality of ears 14 extending radially outwardly therefrom in spaced arrangement and adapted to be engaged by the annular groove 16 provided at the jointure between the threaded bore 6 and the tapered bore 8. The arrangement of the ears 14 and the groove 16 serves to position the plug 12 within the distensible member 4. The lower ends of the plug 12 and the distensible member 4 are of conical form as indicated at 18. The plug 12 may be formed of plastic, metal or other suitable material.

It will be evident that the distensible member 4 will become distended when the pressure of a fluid material acting internally of the distensible member exceeds the pressure applied by the atmosphere on the external surface of the distensible member by a sufficient degree to provide the force required to distend the member. It will also be evident that when the pressure of the fluid material acting internally of the distensible member is equal to or less than the atmospheric pressure applied externally of the distensible member, the member, being in engagement with the plug 12, will provide in conjunction with the plug a valve or seal preventing leakage of the fluid material from the container and preventing exposure of the fluid material within the container, as is desirable, for example, when the material involved is a volatile, light sensitive, sterile or other type of material desirably protected from the atmosphere at all times.

The materials from which the distensible member 4 and the plug 12 would be formed for any particular application would be selected so as to be unaffected by the fluid to be carried therebetween. The material and the wall thickness of the member 4 in the region of the bore 10 would be selected so that this portion of the distensible member would be sufficiently distensible under predetermined pressures of the fluid delivered thereto from the container 13 so that at these pressures there would be sufficient distention of the member 4 in the region of the plug 12 to provide a passage between the wall of the fluid material therethrough. In cases where, for example, the container 13 is a flexible bottle, the distensible member will be selected so that, when the container is squeezed by hand, fluid contained therein will be forced through the distensible member and discharged therefrom at the conical end thereof. The conically formed end may be provided, for example, so that drops of material may be delivered with convenience. It will be evident that the lowermost end of the conduit and valve arrangement shown in Figure 1 may be variously formed depending upon the manner in which the fluid material is desirably dispensed.

In Figure 2 there is shown generally at 44 an embodiment of the invention including a distensible sleeve 46 having a supporting rod 48 extending axially therethrough and being in sealing engagement with the inner wall of the sleeve. The lowermost end 50 of the supporting rod 48 as viewed in the figure extends beyond the lower end 52 of the sleeve 48 and the portion 50 of the rod and the portion 52 of the sleeve are formed to provide a conical end portion terminating in a sharp point.

The upper end of the sleeve 46, as indicated in Figures 2 and 3, is integrally joined with a flexible chamber-forming body indicated generally at 54. The chamber-forming body is in the form of a pair of hollow truncated cones 56 having their base portions 57 closed off and their truncated ends joined together at 58. The upper end portion of the rod 48 is in the form of a loop 60 supported by the cones 56 at the jointure 58 thereof. The portion of the rod between the rod 48 and the loop 60 is preferably formed with an inwardly bowed portion 59 to provide free space around the entire circumference of the rod 48 for the entry of fluid into the sleeve 46.

It will be evident that the arrangement shown in Figures 2 and 3 provides a sealed container or reservoir for fluid material which may be dispensed through the flexible sleeve 46 if the reservoir 56 is made of sufficiently flexible material, if the sleeve 46 is made of suitably distensible material and if sufficient pressure is applied to the reservoir 56 to distend the distensible sleeve 46.

This arrangement is particularly applicable to the formation of a hypodermic syringe in which the rod 48 may preferably be formed of a corrosion resistant wire or other suitable material having sufficient hardness to be sharpenable to a point suitable for penetrating the skin of a patient. The rod 48 will serve both to puncture the skin and to support the sleeve or needle 46. Inasmuch as plastic materials afford low friction when in contact with skin, the needle 46 will afford relatively little resistance to penetration. Once the needle is inserted an injectable contained within the reservoir 54 may readily be injected as a result of the application of sufficient pressure on the flexible walls of the reservoir 54 to collapse the reservoir and to distend the needle 46.

It will be evident that the arrangement described in connection with Figures 2 and 3 provides an inexpensive and disposable hypodermic by means of which a fixed prepared dose may be provided containing tetanus toxoid, morphine, various antidotes and other injectables in convenient form for emergency treatment and expeditious use.

In Figures 4 and 5 there is shown an alternative embodiment of the invention shown and described in connection with Figures 2 and 3 in which a hypodermic needle in the form of a distensible sleeve 62 is provided with a longitudinally extending supporting rod 64. The lowermost ends of the needle 62 and the rod 64 are of conical form as indicated at 66 with the rod 64 providing a sharp point extending beyond the end of the sleeve 62 and serving to facilitate penetration by the needle forming sleeve.

The upper end of the sleeve 62, as viewed in Figure 4, is attached to the apex of an inverted conically formed reservoir, indicated at 68, having flat sides 69. The top or base 70 of the reservoir is depressed inwardly. The upper end portion 72 of the supporting rod 64 extends through the reservoir 68 and through the inwardlymost depressed portion of the base 70 of the reservoir in a loop formed portion 76.

In this embodiment of the invention there is provided a hypodermic and an integral reservoir for an injectable in which the supporting rod 64 for the needle 62 may be withdrawn after insertion of the needle has been accomplished, thus providing in effect a needle of larger size than is provided by the arrangement described in connection with Figures 2 and 3. Withdrawal of the supporting rod is easily accomplished by gripping the loop 76 and withdrawing the rod portions 72 and 64 through the base 70 of the reservoir. The base portion 70 of the reservoir through which the supporting rod is adapted to be withdrawn is depressed inwardly in order that after withdrawal of the supporting rod has been accomplished, pressure acting on the internal surface of the base 70, when the reservoir 68 is compressed in order to discharge the injectable through the needle, will set up compressive forces in the base portion 70 serving to close off the opening therein through which the supporting rod 64 was withdrawn and thus leakage will not occur through this opening.

In Figure 6 there is shown a hypodermic needle in the form of a sleeve 80 which may be formed of a flexible material through which there is inserted a supporting rod 82. The lower end of the rod 82 is sharpened to a point as indicated in 84 and the lower end sleeve 80 is relieved as indicated at 86 the surface 84 and 86 forming a sharpened point facilitating entry of the hypodermic needle. After the needle has been inserted, the supporting rod 82 may be withdrawn from the sleeve 80, the rod 82 being formed at its upper end, as viewed in Figure 6, with a loop 88 in order to facilitate the widthdrawl. The upper end of the needle 80 is flared outwardly and provided with a conical internal surface 90 which is adapted to receive a syringe or a fluid conduit.

This type of hypodermic needle is employed by first inserting the needle into the part of the body to receive the injection and then removing the supporting rod 82. This removal of the supporting rod 82 will serve to draw blood up into the needle 80 and thus there is no possibility of air being entrapped with the injectable when the syringe is entered into the tapered outermost end of the needle. This type of needle is not only much less expensive than the conventional steel needle but is also much more safely employed than the conventional steel needle. It will be evident that neither the supporting rod 82 nor the flexible needle 80 are as susceptible to breakage as a steel needle, and, after the needle 80 has been inserted and the supporting rod 82 removed, the flexible needle 80 may be permitted to remain inserted in the patient's body over extended periods of time without the need for providing elaborate protection against contact of foreign objects with the needle or motion of the needle with respect to the body.

In Figure 7 there is shown an alternative form of the arrangement shown in Figure 6 in which a needle 92 is provided with a reduced diameter inner bore portion 93 extending for only a relatively short distance from the tapered lower end 94 thereof. A supporting rod 96 is adapted to be in engagement only with the reduced diameter portion 93 of the needle 92 and is, of course, provided at its lower end with a point 98 facilitating penetration by the needle. After the needle has penetrated into the portion of the body to receive an injection, the rod 96 may be gripped by a loop-formed upper end portion 100 thereof and will be withdrawn from the flexible needle 92. This type of needle may be employed when a relatively large bore needle is required. If the needle 92 is formed of a distensible material, the reduced diameter bore portion 93 thereof may be easily distended in response to pressure applied by an injectable existing within the needle. It will be evident that this type of needle formation may be employed in connection with the forms of the invention previously described in connection with Figures 2–5.

In Figure 8 there is shown an alternative form of the arrangement shown in Figure 6 providing a form of hypodermic needle desirably employed in conditions where there is afforded a substantial resistance to penetration by the needle. In this form of the invention there is provided a flexible needle 102 provided with a reduced diameter bore portion 104 adjacent to the tapered lower end 106 thereof. A supporting rod 108 extends through the needle and is in engagement with the internal wall thereof. The lower end of the rod 108 is provided with a reduced diameter portion 110 which is adapted to be in sealing engagement with the wall of the reduced diameter bore portion 104 of the needle. The lowermost end of the reduced diameter portion 110 of the supporting rod is provided with a point 112 to facilitate penetration. The shoulder 114 adjacent to the upper end of the reduced diameter portion 110 of the supporting rod provides additional support for the lowermost end of the needle 102 which is, of course, the first portion of the needle to penetrate. It thus provides support for the portion of the needle most in need of support. It will be evident that this form of hypodermic needle may be employed in conjunction with the embodiments of the invention described in connection with Figures 2–5.

It will be noted that various combinations of the arrangements shown in Figures 6–8 may be employed and that these combinations may be employed in combination with the embodiments of the invention described in connection with Figures 2–5.

The embodiments of the invention shown in Figures 4–8 afford the further advantage of providing an indication of whether or not the end of the needle, when inserted, has penetrated a vein by virtue of the fact that, if the end of the needle has penetrated a vein, blood will be drawn up into the needle as the rod is removed therefrom and, if the needle is made of a clear material, the blood therein will be visible from the exterior of the needle.

In Figures 9 and 10, there is shown a modified form of the hypodermic needle shown in Figure 6 which includes a distensible needle 120 and a supporting rod 122. The lower end of the supporting rod 122 terminates beyond the lower end of the distensible needle and the ends of the rod and the needle are formed as indicated at 124 to provide a pointed end to facilitate penetration by the needle. The upper end of the needle is flared outwardly and provided with a internal conically-shaped region 126 adapted to receive a mating conical end 128 of a syringe.

In this modification of the invention, the upper end of the supporting rod 122 is deflected and passes upwardly embedded in the conically-formed portion 126 of the needle 120 as is indicated at 130 and terminates in a ring-shaped end portion 132 positioned on a plane extending transversely of the portion 126 and having its inner edge extending inwardly of the conically-formed portion 126. This construction provides means adapted to enter a circumferential groove 134 provided in the mating conical surface 128 of the syringe and thus forms clamping means serving to retain the end of a syringe in engagement with the hypodermic needle. By the employment, in this form of the invention, of a distensible material in the formation of the needle 120 an injectable can be forced through the needle by the application of sufficient pressure in a manner identical with that described in connection with the embodiments of the invention described in conjuncton wth Figures 1–5.

It will be evident from the foregoing that the invention embraces the provision of an extremely simple fluid conduit and flow control means. The invention has numerous applications as have been heretofore mentioned. However, reference is again made to the invention as providing a low cost disposable hypodermic syringe particularly adapted for emergency treatment and expeditious use. It has been recently determined that serum hepatitis is transmitted by the reuse of hypodermic needles and that ordinary boiling is not enough to obviate the danger of transmission of this disease. The inexpensive disposable hypodermic needle made possible by the present invention eliminates the necessity of providing expensive autoclaves such as are required for sterilization of the more conventional type of relatively expensive hypodermic needle which is used repeatedly.

It is additionally noted that by the employment of a distensible material there may be provided, in possibly three or four sizes of hypodermic needles constructed in accordance with the present invention, an effective range of needle sizes such as now obtained by more than a dozen sizes of conventional steel needles. Thus, by the employment of the present invention, the number of sizes of hypodermic needles which must be available for general use is greatly reduced.

In addition to the low cost, disposability, and reduction in the necessary number of sizes of needles made possible by the present invention, the flexibility provided by the plastic or rubber needle provides still further advantages with regard to safety and comfort as have been heretofore discussed.

What is claimed is:

1. A hypodermic needle comprising a distensible needle forming member, a passage within said member, one end of said passage connecting with the exterior of said member, and support means extending within said passage for supporting said needle forming member and blocking off said passage, said support means extending beyond the end of said passage exteriorly of said member, said member being formed to provide an enclosed flexible reservoir for an injectable connecting with the other end of said passage, the exposed end of said support means and the end of the needle forming member adjacent thereto being formed to provide a point facilitating penetration by the hypodermic needle, said support means supporting the distensible needle forming member during the penetration and said distensible needle forming member distending in response to the increased pressure exerted therein by the injectable when pressure is applied on the flexible reservoir and providing space for flow of the injectable between the needle forming member and support means into the body penetrated by the hypodermic needle.

2. Apparatus in accordance with claim 1 in which said support means extends through said enclosed flexible reservoir to the exterior thereof whereby said support means may be withdrawn from said passage to a desired degree.

3. A hypodermic needle comprising a flexible distensible needle forming member, a passage within said member, at least one end of said passage connecting with the exterior of said member, and support means extending within said passage in engagement with said member for supporting said member and blocking off said passage, said support means extending beyond said one end of said passage exteriorly of said member, the exposed end of said support means and the end of the needle forming member adjacent thereto being formed to provide a point facilitating penetration by the hypodermic needle, said support means supporting said member during the penetration, and said member being adapted to receive a fluid flow under pressure at the other end of said passage and to distend in response to the fluid pressure providing a space between said member and said support means through which said fluid may flow to the pointed end of the needle.

4. Apparatus in accordance with claim 3 including an enclosed reservoir connecting with said other end of said passage.

5. Apparatus in accordance with claim 3 in which said member is formed to provide an enclosed reservoir connecting with said other end of said passage.

6. Apparatus in accordance with claim 3 in which said support means is in engagement with the entire circumference of the inner wall of said passage for only a relatively short length thereof extending from said pointed end.

7. Apparatus in accordance with claim 3 in which said member is formed for connection and disconnection of said other end of said passage with a fluid source.

8. Apparatus in accordance with claim 3 in which said member and said support means are formed for connection and disconnection of said other end of said passage with a fluid source.

9. Apparatus in accordance with claim 8 in which the reservoir is formed of a distensible material.

10. Apparatus in accordance with claim 8 in which said needle forming member and said reservoir are integrally formed from a distensible material.

11. Apparatus comprising a hypodermic needle including a deformable needle forming member, a passage within said member, one end of said passage connecting with the exterior of said member, support means extending within said passage for supporting said needle forming member and blocking off said passage, the exposed end of said support means and the end of the needle forming member adjacent thereto being formed to provide a point facilitating penetration of a body by the hypodermic needle, said support means supporting the needle forming member during penetration and a deformable elastic reservoir attached to the other end of said needle forming member, the interior of said reservoir being adapted to contain an injectable and being connected with the other end of said passage, the other end of said support means extending through the reservoir wall whereby the support means may be withdrawn after penetration of the needle forming member into a body, said reservoir wall acting to seal the opening therein upon withdrawal of said support means.

12. A hypodermic needle comprising a distensible needle forming member, a passage within said member, one end of said passage connecting with the exterior of said member, and support means extending within said passage for supporting said needle forming member and blocking off said passage, said support means extending beyond the end of said passage exteriorly of said member, an enclosed flexible reservoir for an injectable connecting with the other end of said passage, the exposed end of said support means and the end of the needle forming member adjacent thereto being formed to provide a point facilitating penetration by the hypodermic needle, said support means supporting the distensible needle forming member during the penetration and said distensible needle forming member distending in response to the increased pressure exerted therein by the injectable when pressure is applied on the flexible reservoir and providing space for flow of the injectable between the needle forming member and support means into the body penetrated by the hypodermic needle.

13. Apparatus in accordance with claim 12 in which said support means extends through said enclosed flexible reservoir to the exterior thereof whereby said support means may be withdrawn from said passage to a desired degree.

14. A hypodermic needle comprising a flexible plastic needle forming member requiring support for penetration, a passage within said member, one end of said passage connecting with the exterior of said member, support means extending within said passage for blocking off said passage and for supporting said needle forming member during penetration, said support means extending beyond the end of said passage exteriorly of said member, the exposed end of said support means and the end of the needle forming member adjacent thereto being formed to provide a point facilitating penetration by the hypodermic needle, a flexible reservoir integrally connected to the other end of said passage, and said support means extending through said flexible reservoir to the exterior thereof whereby said support means may be withdrawn from said passage to a desired degree.

15. A hypodermic needle comprising a flexible plastic needle forming member requiring support for penetration, a passage within said member, one end of said passage connecting with the exterior of said member, support means extending within said passage for blocking off said passage and for supporting said needle forming member during penetration, said support means extending beyond the end of said passage exteriorly of said member, the exposed end of said support means and the end of the needle forming member adjacent thereto being formed to provide a point facilitating penetration by the hypodermic needle and an enclosed flexible reservoir integrally connected the other end of said passage.

16. A hypodermic needle comprising a flexible plastic needle forming member requiring support for penetration, a passage within said member, one end of said passage connecting with the exterior of said member, support means extending within said passage for blocking off said passage and for supporting said needle forming member during penetration, said support means extending beyond the end of said passage exteriorly of said member, the exposed end of said support means and the end of the needle forming member adjacent thereto being formed to provide a point facilitating penetration by the hypodermic needle, and said member being adapted to receive a fluid flow under pressure at the other end of said passage.

References Cited in the file of this patent

UNITED STATES PATENTS

| 1,835,287 | Donovan | Dec. 8, 1937 |
|---|---|---|
| 2,088,783 | Hage | Aug. 3, 1937 |
| 2,098,886 | Safford | Nov. 9, 1937 |
| 2,512,568 | Saffir | June 20, 1950 |
| 2,590,895 | Scarpellino | Apr. 1, 1952 |
| 2,693,803 | Ogle | Nov. 9, 1954 |

FOREIGN PATENTS

| 336,530 | Germany | 1921 |

OTHER REFERENCES

"Surgery," volume 31, Number 1, January 1952, p. 117.